(12) United States Patent
Chiu et al.

(10) Patent No.: US 9,151,955 B2
(45) Date of Patent: Oct. 6, 2015

(54) PROJECTION SYSTEM AND LIGHT-HOMOGENIZING DEVICE ADJUSTMENT ELEMENT

(71) Applicants: Sheng-Yu Chiu, Hsin-Chu (TW); Chih-Hui Chang, Hsin-Chu (TW)

(72) Inventors: Sheng-Yu Chiu, Hsin-Chu (TW); Chih-Hui Chang, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 13 days.

(21) Appl. No.: 14/140,954

(22) Filed: Dec. 26, 2013

(65) Prior Publication Data

US 2014/0185022 A1 Jul. 3, 2014

(30) Foreign Application Priority Data

Dec. 27, 2012 (CN) .......................... 2012 1 0578620

(51) Int. Cl.
*G03B 21/28* (2006.01)
*G02B 27/09* (2006.01)
*H04N 9/31* (2006.01)
*G03B 21/20* (2006.01)

(52) U.S. Cl.
CPC ............ *G02B 27/0933* (2013.01); *G03B 21/28* (2013.01); *H04N 9/3152* (2013.01); *G03B 21/208* (2013.01)

(58) Field of Classification Search
CPC ... H04N 9/3152; H04N 9/3197; G03B 21/28; G03B 21/208

USPC .......................... 353/30, 34, 37, 38, 99, 119; 348/743–747
See application file for complete search history.

(56) References Cited

U.S. PATENT DOCUMENTS

| | | | |
|---|---|---|---|
| 6,773,118 B2* | 8/2004 | Lee | 353/122 |
| 6,796,661 B2* | 9/2004 | Hirobe | 353/84 |
| 7,717,572 B2* | 5/2010 | Hsu et al. | 353/97 |
| 8,128,234 B2* | 3/2012 | Huang et al. | 353/38 |
| 2003/0098956 A1* | 5/2003 | Chang et al. | 353/52 |
| 2006/0092389 A1* | 5/2006 | Wang | 353/99 |
| 2006/0092391 A1* | 5/2006 | Lin | 353/119 |
| 2009/0015802 A1* | 1/2009 | Ho | 353/102 |
| 2009/0262315 A1 | 10/2009 | Tseng et al. | |

FOREIGN PATENT DOCUMENTS

| | | |
|---|---|---|
| CN | 1782858 A | 6/2006 |
| CN | 101477242 | 7/2009 |
| CN | 101354463 | 10/2009 |

* cited by examiner

*Primary Examiner* — Sultan Chowdhury
(74) *Attorney, Agent, or Firm* — Muncy, Geissler, Olds & Lowe, P.C.

(57) ABSTRACT

The invention provides a projection system and a light-homogenizing device adjustment element for adjusting the position of a light-homogenizing device. The light-homogenizing device adjustment element has an actuator, and the actuator leans against one side of the light-homogenizing device and has a plurality of curved surfaces with different radii of curvature. When the actuator rotates, different curved surfaces push the light-homogenizing device to cause the light-homogenizing device to move in at least one direction from an initial position.

17 Claims, 5 Drawing Sheets

PROJECTION SYSTEM AND LIGHT-HOMOGENIZING DEVICE ADJUSTMENT ELEMENT

BACKGROUND OF THE INVENTION a. Field of the Invention

The invention relates to a display system and an optical device adjustment element, particularly to a projection system and a light-homogenizing device adjustment element.

b. Description of the Related Art

US patent publication no. 20090262315 discloses a position adjustment mechanism using adjusting screws and an elastic member to adjust the position of an integration rod. China patent publication no. 101354463 discloses a position adjustment mechanism using push members and an elastic member to adjust the position of an integration rod. China patent publication no. 101477242 discloses an illumination system having a light source, a light-homogenizing device, a zoom lens group, and a zoom driving device. The light-homogenizing device is actuated by a drive mechanism.

However, according to the above designs, the use of adjusting screws making the position adjustment for an integration rod is liable to interfere with other components inside the housing of an optical engine to reduce operational convenience. Therefore, practically, the entire optical engine is disassembled and additional tooling or other adjusting tool is needed to achieve the position adjustment. This is very inconvenient for the operation on position adjustment or damage repair. Besides, the adjusting tool is liable to interfere with other components inside the optical engine to complicate the adjusting process or even fail to achieve the position adjustment. Moreover, the additional jig or adjusting tool increases the number of components and fabrication costs.

BRIEF SUMMARY OF THE INVENTION

The invention provides a projection system and a light-homogenizing device adjustment element.

Other objects and advantages of the invention may be further illustrated by the technical features disclosed by the invention. In order to achieve one of the above purposes, all the purposes, or other purposes, one embodiment of the invention provides a projection system including a light source, a light-homogenizing device, a light-homogenizing device adjustment element, an imaging device, and a projection lens. The light source emits an illumination light beam, and the light-homogenizing device is located on a transmission path of the illumination light beam for homogenizing the illumination light beam into a uniform light beam. The light-homogenizing device adjustment element includes an actuator, and the actuator leans against one side of the light-homogenizing device and has a plurality of curved surfaces with different radii of curvature. When the actuator rotates, different curved surfaces push the light-homogenizing device to cause the light-homogenizing device to move in at least one direction from an initial position. The imaging device is located on a transmission path of the uniform light beam for transforming the uniform light beam into an image beam, and a projection lens receives the image beam for projection.

In one embodiment, the light-homogenizing device is an integration rod.

According to another embodiment of the invention, a light-homogenizing device adjustment element is used to adjust the position of a light-homogenizing device. The light-homogenizing device adjustment element includes an actuator, and the actuator leans against one side of the light-homogenizing device and has a plurality of curved surfaces with different radii of curvature. When the actuator rotates, different curved surfaces push the light-homogenizing device to cause the light-homogenizing device to move in at least one direction from an initial position.

In one embodiment, the actuator is a cam.

In one embodiment, when the actuator rotates about an axial direction as a rotary center, the different curved surfaces push the light-homogenizing device to cause the light-homogenizing device to move in the at least one direction, and the at least one direction is not parallel to the axial direction.

In one embodiment, the rotary center coincides with a geometric center of the actuator.

In one embodiment, the light-homogenizing device adjustment element further includes a positioning screw leaning against one of a plurality of sides of the light-homogenizing device.

In one embodiment, when the actuator rotates about an axial direction as a rotary center, the light-homogenizing device moves along the axial direction.

In one embodiment, the light-homogenizing device adjustment element has a flange structure, the flange structure is adjacent to the actuator, and the actuator is confined in the flange structure.

In one embodiment, the actuator has a thread structure.

The above embodiments have at least one of the following advantages.

By using a light-homogenizing device adjustment element, the light-homogenizing device may move along at least one dimension in space to improve the flexibility of position adjustment. Besides, using a cam, for example, as an actuator may achieve the effect of the position adjustment with multiple dimensions in space for the light-homogenizing device through the rotation of the actuator. Therefore, the number of components is decreased, the fabrication process is simplified, and the fabrication cost is reduced. Besides, such position adjustment is free from interference of other elements in a projection system to enhance operational convenience and accuracy.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
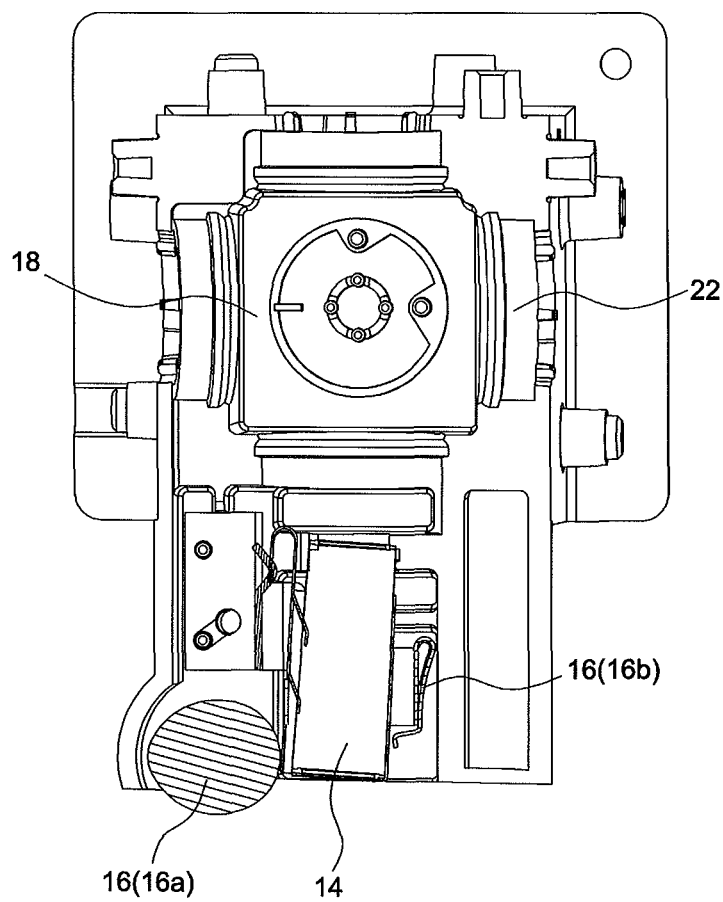
FIG. 1 shows a schematic cross-section of a projection system according to an embodiment of the invention.
Figure 2:
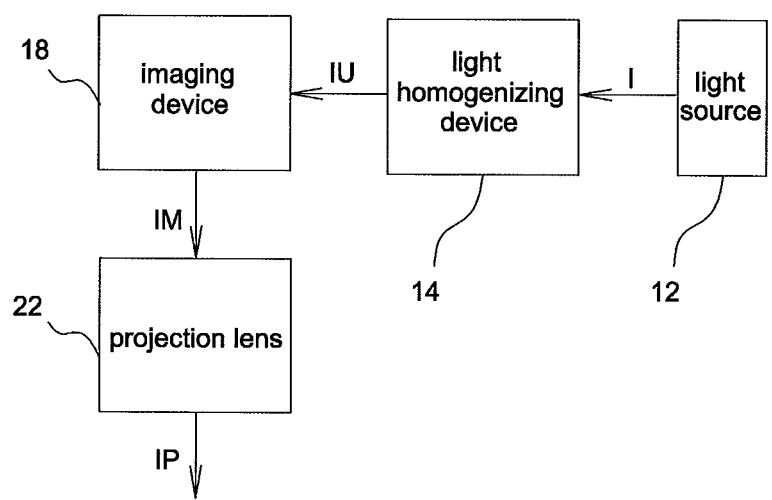
FIG. 2 shows a schematic block diagram illustrating a transmission path of the projection system shown in FIG. 1.

Referring to both FIG. 1 and FIG. 2, a projection system 10 includes a light source 12, a light-homogenizing device 14, a light-homogenizing device adjustment element 16, an imaging device 18, and a projection lens 22. The light-homogenizing device 14 is located on a transmission path of an illumination light beam I emitted by the light source 12 to homogenize the illumination light beam I into an uniform light beam IU. The imaging device 18 is located on a transmission path of the uniform light beam IU to transform the uniform light beam IU into an image beam IM. The projection lens 22 receives the image beam IM for projection to project a projection light beam IP.

Further, the light-homogenizing device adjustment element 16 leans against the light-homogenizing device 14 to adjust the position of the light-homogenizing device 14 to ensure that the uniform light beam IU passing through the light-homogenizing device 14 accurately forms an image within an effective area. In this embodiment, the light-homogenizing device adjustment element 16 may include an actuator 16a and at least one elastic member 16b. The actuator 16a leans against one side of the light-homogenizing device 14, and the elastic member 16b leans against another side of the light-homogenizing device 14 facing backward the actuator 16a. Besides, the actuator 16a may have a plurality of curved surfaces with different radii of curvature. When the actuator 16a rotates, the curved surfaces may push the light-homogenizing device 14 to cause the light-homogenizing device 14 to move in at least one direction from an initial position, wherein the initial position may be an arbitrary position.

Figure 3:
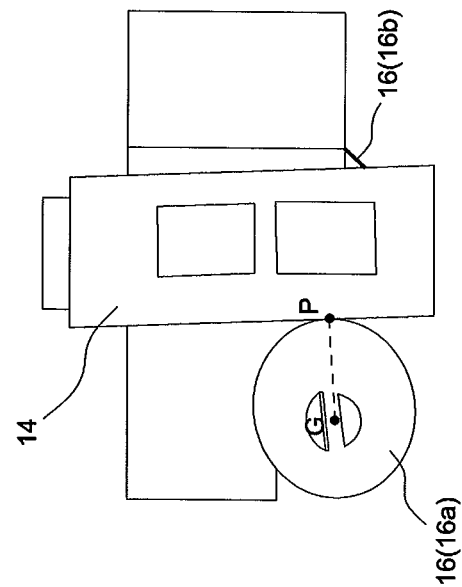
FIG. 3 and FIG. 4 show schematic diagrams illustrating an operation of a light-homogenizing device adjustment element for a light-homogenizing device according to an embodiment of the invention.
Figure 4:
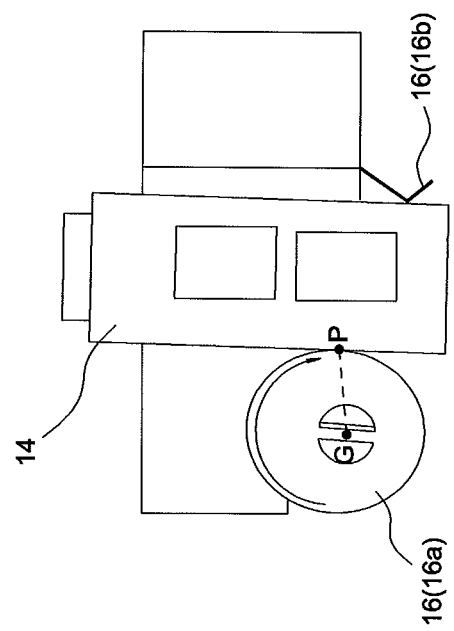

For example, as shown in FIG. 3 and FIG. 4, the light-homogenizing device 14 may be an integration rod, and the actuator 16a may be a cam. When the actuator 16a rotates clockwise about its geometric center G as a rotary center, a distance from the geometric center G to a contact point P between the light-homogenizing device 14 and the actuator 16a may increase to thus achieve the effect of pushing the light-homogenizing device 14. Besides, since the light-homogenizing device 14 may also press the elastic member 16b, the elastic member 16b may exert resilient forces on the light-homogenizing device 14 once the actuator 16a rotates counterclockwise. The resilient forces mentioned above may, for example, cause the elastic member 16b to return to an original position, but the invention is not limited thereby. Therefore, through the cooperation between the actuator 16a and the elastic member 16b, the actuator 16a may rotate along a direction to adjust the position of the light-homogenizing device 14. This ensures the uniform light beam IU passing through the light-homogenizing device 14 to form an image within an effective area to achieve high image qualities.

Certainly, a center axis of rotation of the actuator 16a may or may not coincide with the geometric center G of the actuator 16a, depending on actual demands of design.

Figure 5:
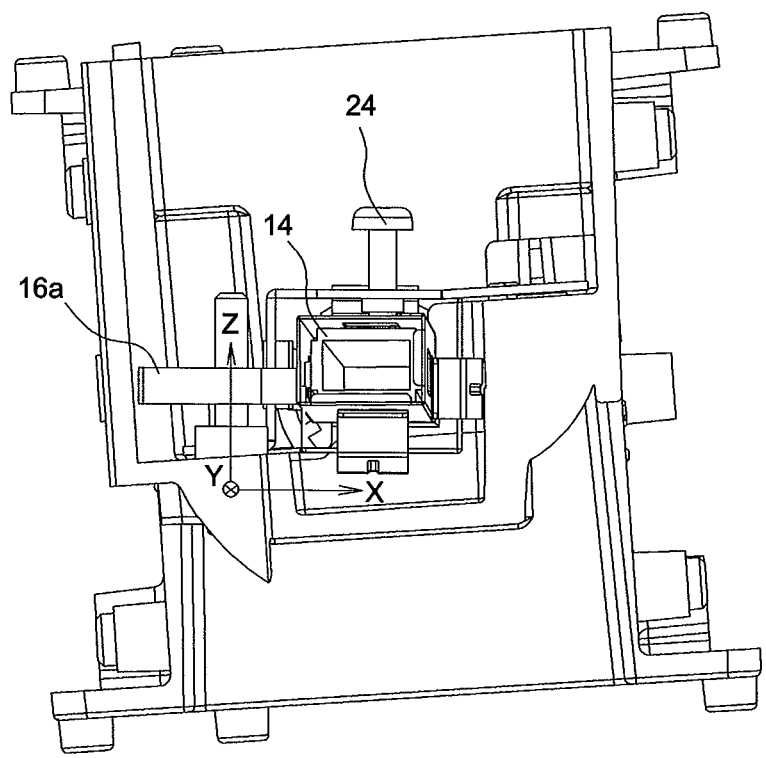
FIG. 5 shows another schematic cross-section of the projection system shown in FIG. 1.

Referring to FIG. 5, the light-homogenizing device adjustment element 16 further includes a positioning screw 24, and the positioning screw 24 leans against one side of the light-homogenizing device 14 (such as the top side shown in FIG. 5). Under the circumstance, when the actuator 16a rotates about the Z-axis, the actuator 16a may not move along the Z-axis but different curved surfaces of the actuator 16a may push the light-homogenizing device 14 to allow the light-homogenizing device 14 to move in a direction that is not parallel to the Z-axis (such as a direction parallel to the X-axis, a direction parallel to the Y-axis, or a oblique direction as a composite of X-axis and Y-axis components).

Figure 6:
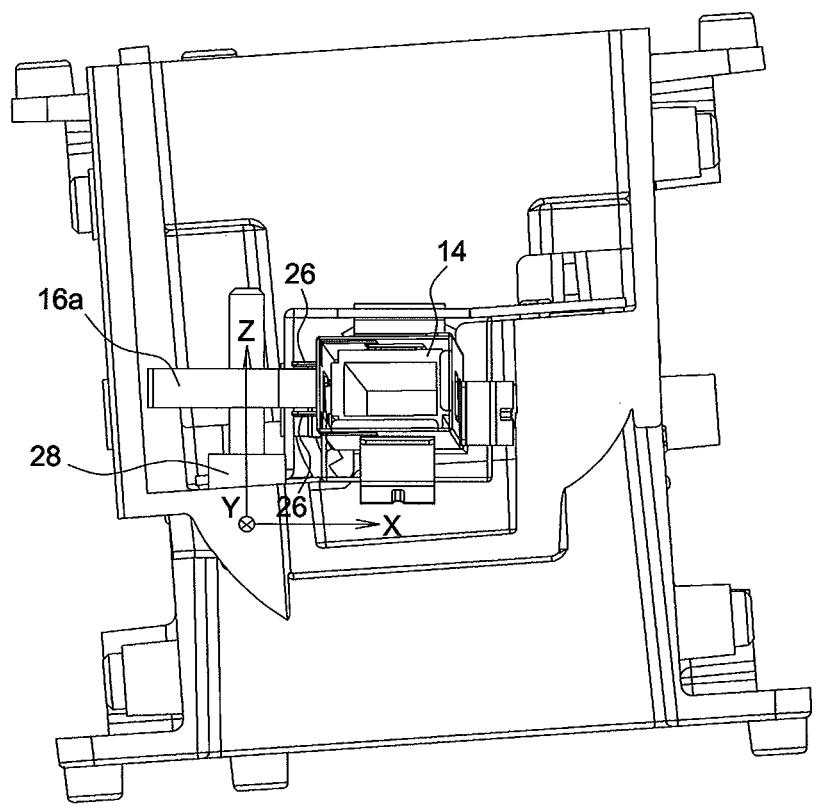
FIG. 6 shows a schematic cross-section of a projection system according to another embodiment of the invention.

Further, in an alternate embodiment shown in FIG. 6, the light-homogenizing device 14 of the projection system 30 may have a flange structure 26. The actuator 16a is adjacent to the flange structure 26 and confined in the flange structure 26. Besides, the bottom of the actuator 16a may have a thread structure 28, and the actuator 16a may be screwed in the projection system 30 by the thread structure 28. Therefore, when the actuator 16a rotates clockwise or counterclockwise about the Z-axis, the actuator 16a may move up or down along the Z-axis by the thread structure 28 and push the flange structure 26 to force the light-homogenizing device 14 to move. Under the circumstance, the light-homogenizing device 14 and thread structure 28 may respectively move on the X-Y plane and along the Z-axis at the same time to thus achieve the effect of the position adjustment with multiple dimensions in space.

Accordingly, the projection system according to the above embodiments has at least one of the following advantages. In the embodiment of the invention, by using a light-homogenizing device adjustment element, the light-homogenizing device may move along at least one dimension in space to improve the flexibility of position adjustment. In the embodiment of the invention, using a cam, for example, as an actuator may achieve the effect of the position adjustment with multiple dimensions in space for the light-homogenizing device through the rotation of the actuator. Therefore, the number of components is decreased, the fabrication process is simplified, and the fabrication cost is reduced. Besides, such position adjustment is free from interference of other elements in a projection system to enhance operational convenience and accuracy.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection system, comprising:
   a light source for emitting an illumination light beam;
   a light-homogenizing device located on a transmission path of the illumination light beam, for homogenizing the illumination light beam into an uniform light beam;
   a light-homogenizing device adjustment element comprising an actuator leaning against one side of the light-homogenizing device and having a plurality of curved surfaces with different radii of curvature, wherein, when the actuator rotates about an axial direction as a rotary center, the curved surfaces push the light-homogenizing device to cause the light-homogenizing device to move in at least one direction from an initial position, and the at least one direction comprises a direction not parallel to the axial direction;
   an imaging device located on a transmission path of the uniform light beam, for transforming the uniform light beam into an image beam; and
   a projection lens for receiving the image beam for projection.

2. The projection system as claimed in claim 1, wherein the light-homogenizing device is an integration rod.

3. The projection system as claimed in claim 1, wherein the actuator is a cam.

4. The projection system as claimed in claim 1, wherein the rotary center coincides with a geometric center of the actuator.

5. The projection system as claimed in claim 1, wherein the light-homogenizing device adjustment element further comprises:
   a positioning screw leaning against one of a plurality of sides of the light-homogenizing device.

6. The projection system as claimed in claim 1, wherein the light-homogenizing device moves along the axial direction.

7. The projection system as clamed in claim 6, wherein the light-homogenizing device adjustment element has a flange structure, the flange structure is adjacent to the actuator, and the actuator is confined in the flange structure.

8. The projection system as claimed in claim 6, wherein the actuator has a thread structure.

9. The projection system as claimed in claim 1, wherein the light-homogenizing device adjustment element further comprises:
   at least one elastic member, leaning against another one side of the light-homogenizing device facing backward the actuator, for exerting resilient forces on the light-homogenizing device.

10. A light-homogenizing device adjustment element, for adjusting a position of a light-homogenizing device, the light-homogenizing device adjustment element comprising:
    an actuator leaning against one side of the light-homogenizing device and having a plurality of curved surfaces with different radii of curvature, wherein, when the actuator rotates about an axial direction as a rotary center, the curved surfaces push the light-homogenizing device to cause the light-homogenizing device to move in at least one direction from an initial position and the at least one direction comprises a direction not parallel to the axial direction.

11. The light-homogenizing device adjustment element as claimed in claim 10, wherein the actuator is a cam.

12. The light-homogenizing device adjustment element as claimed in claim 10, wherein the rotary center coincides with a geometric center of the actuator.

13. The light-homogenizing device adjustment element as claimed in claim 10, further comprising:
    a positioning screw leaning against one of a plurality of sides of the light-homogenizing device.

14. The light-homogenizing device adjustment element as claimed in claim 10, wherein the light-homogenizing device moves along the axial direction.

15. The light-homogenizing device adjustment element as clamed in claim 14, wherein the light-homogenizing device adjustment element has a flange structure, the flange structure is adjacent to the actuator, and the actuator is confined in the flange structure.

16. The light-homogenizing device adjustment element as claimed in claim 14, wherein the actuator has a thread structure.

17. The light-homogenizing device adjustment element as claimed in claim 10, further comprising:
    at least one elastic member, leaning against another one side of the light-homogenizing device facing backward the actuator, for exerting resilient forces on the light-homogenizing device.

* * * * *